(12) United States Patent
Matsumoto

(10) Patent No.: US 6,307,648 B1
(45) Date of Patent: Oct. 23, 2001

(54) LINE SOURCE UNIT AND IMAGE INPUT APPARATUS

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,892

(22) Filed: Nov. 10, 1998

(30) Foreign Application Priority Data

Jul. 6, 1998 (JP) .................................................. 10-190666

(51) Int. Cl.[7] ....................................................... H04N 1/04
(52) U.S. Cl. ........................................ 358/474; 250/578.1
(58) Field of Search .................................. 358/474, 484, 358/483, 482, 518, 400, 509, 511, 475; 250/578.1, 227.31, 227.11

(56) References Cited

U.S. PATENT DOCUMENTS

| | | | |
|---|---|---|---|
| 5,182,445 | 1/1993 | Yamashita | 250/208.1 |
| 5,489,992 | * 2/1996 | Endo | 358/482 |
| 5,859,421 | * 1/1999 | Onishi | 250/208.1 |
| 6,002,494 | * 12/1999 | Tabata | 458/475 |
| 6,055,072 | * 4/2000 | Tabata | 358/509 |
| 6,166,832 | * 12/2000 | Fujimoto | 358/484 |

FOREIGN PATENT DOCUMENTS 8163320  6/1996  (JP) .

* cited by examiner

*Primary Examiner*—Jerome Grant, II
*Assistant Examiner*—Negussie Worku
(74) *Attorney, Agent, or Firm*—Rothwell, Figg, Ernst & Manbeck

(57) ABSTRACT

A line source unit with a uniform light generation characteristic and an image input apparatus are provided. In the line source unit, only defective element(s) can be replaced. Light enters at the side portion of a light guiding member which is transparent and placed within a cover, and travels within the light guiding member undergoing total reflection. The light is then released to the outside of the member by reflecting the light at a light diffusing portion formed on a part of the light guiding member. Inner part of the cover which closely contacts with the light guiding member is partly black in color, within a predetermined range from light generation elements. With this construction, the line source unit provides a uniform light amount.

20 Claims, 18 Drawing Sheets

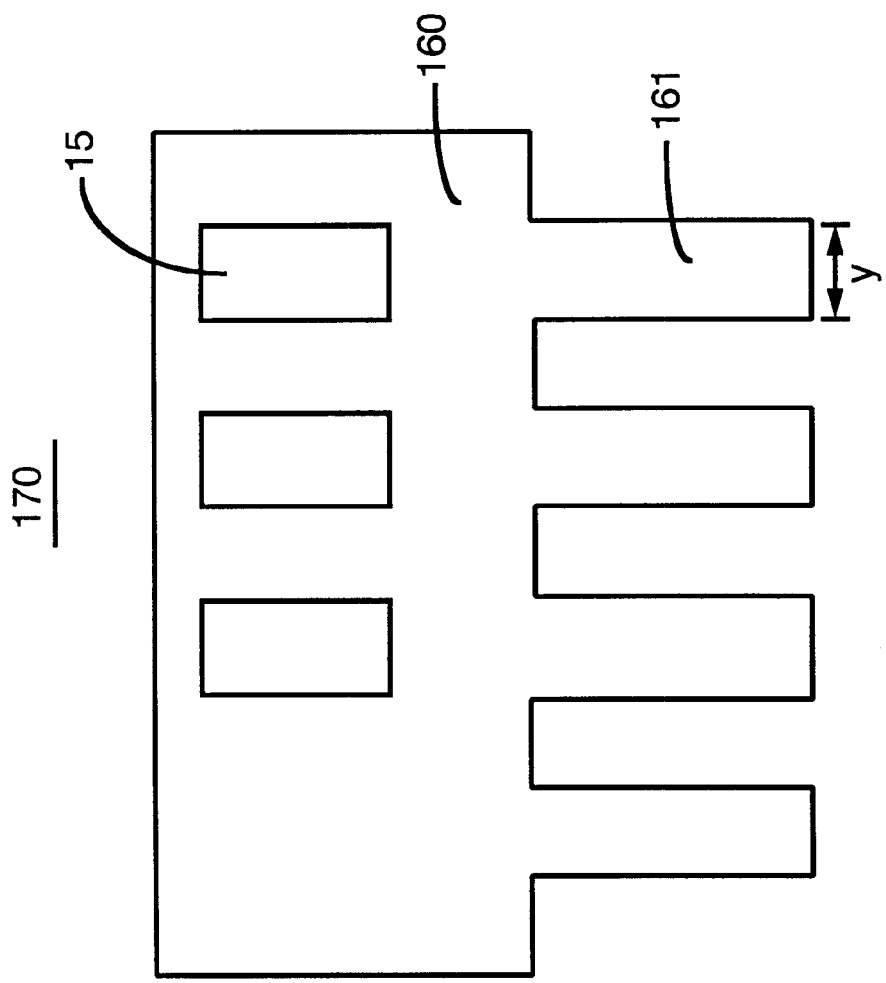

LINE SOURCE UNIT AND IMAGE INPUT APPARATUS

BACKGROUND OF THE INVENTION

1. Field of the Invention

The present invention relates to a line source unit and an image input apparatus for use in an image input unit of a facsimile machine, a scanner, an image sensor and the like.

2. Description of the Prior Art

One example of a line source unit as a light source used in an image sensor for reading characters and images on a document or an original, is described in the Japanese Laid-Open Patent Publication No. 8-163320. FIGS. 13 to 16 schematically show a bar-type lighting apparatus and a document reading apparatus (i.e., an image sensor) using the bar-type lighting apparatus, disclosed in the above Japanese Laid-Open Patent Publication.

FIG. 13 is an exploded perspective view of a conventional line source unit. FIG. 14 shows the line source unit from which light of line-shaped being emitted. FIGS. 15A and 15B show a light generation device used in the line source unit, where FIG. 15A is a front view of the device and FIG. 15B, a side view. FIG. 16 is a sectional view of an image sensor (a contact-type image sensor) using this line source unit.

The line source unit and the image sensor shown in FIGS. 13 to 16 include a light generation device 1 for generating a line-shaped light, a light guiding member 2, a cover 3, a resin molded member 4 partly forming the light generation device 1, pins 5 and a sensor board 6. The light guiding member 2 conducts light from the light generation device 1 onto an original. Part of the light passing through the light guiding member 2 but not directing toward the original, is reflected again by the cover 3 so as to direct the light toward inside the light guiding member. The cover has a tone with a large reflection rate such as that of white. The pins 5 electrically connect the light generation device 1 and the sensor board 6 of the image sensor.

The line source unit and the image sensor further include a plurality of LED chips (bare chips) 7 mounted on the resin molded member 4, a sheet copper 8 which electrically connects the LED chips 7 and the pins 5 and has these LED chips 7 on it, a glass plate 10 arranged to the position where an original 9 travels, and a rod lens array 11 for an erected-equimagnification-image formation consisting of a plurality of rod lenses (not shown).

It should be noted that sensor ICs 12 are rectilinearlly placed on the sensor board 6. Frame 13 positions each of the above-described elements, and the LED chips 7 have a sealing material 14 for protecting themselves from oxidation and an external force.

The operation of the line source unit and the image sensor is now explained. Anode and cathode (not shown) of the LED chip 7 are respectively connected to the pins 5 via the sheet copper 8. These pins 5 are further connected to the sensor board 6, and the sensor board 6 itself is electrically connected to the external part of the image sensor. When an external voltage is applied to the anode and cathode of the LED chip 7 through the sensor board 6 and the pins 5, the LED chips 7 generate light. The light then enters inside the light guiding member 2 which is equipped to neighbor these chips.

The light is reflected by a light diffusing layer formed on the light guiding member 2. The light diffusing layer is formed by printing a color of white on the guiding member.

In another application, the layer has the small convex and concave (not shown) which are built up on the light guiding member 2 itself. The light guiding member 2 therefore emits uniform light in the direction as indicated with arrows in FIG. 14.

In the image sensor shown in FIG. 16, light coming from the light guiding member 2 illuminates the original 9 through the glass plate 10. The illuminated light is reflected by the original in accordance with gradation of images contained in the original, and the reflected light travels through rod lenses located on the rod lens array 11, thus forming an image on the sensor ICs 12. Though each sensor IC 12 is several millimeters in length, a plurality of the sensor ICs 12 are arranged in line so that they achieve conformity with a readout width of the image sensor. These sensor ICs 12 store electric charge in accordance with the strength of an incoming reflected light, and output the electric charge through the sensor board 6. The frame 13 physically supports the rode lens array 11, the glass plate 10, and the sensor board 6 which constitute the image sensor.

The prior art line source unit has a problem that if the unit is determined to be defective after it is manufactured, because of the fact that only one of the LED chips 7, for example, does not light properly, the chip can neither be repaired nor replaced with a good one. Therefore, the defective chip can not help being discarded together with the remaining non-defective LED chips. Furthermore, similar to the above case, if one or more of the LED chips 7 after being shipped as a final product or installed in the image sensor, do not light due to deterioration or its operational life, all of the chips installed have no choice but to be discarded.

Especially, since the LED itself is a bare chip with a size of several tens of micrometer ($\mu$m) square, there is a disadvantage that it is difficult to determine whether the chip is defective or not before it is implemented on the sheet copper 8. This requires to check whether the chip lights properly or not, after the implementation on the sheet copper, thus increasing the frequency of discarding defective chips.

Taking this problem into consideration, a trial has been made, as shown in FIG. 17, to obtain a light generation device with LED chips 15 which are implemented on a base board 16. These chips are packaged within a transparent resin so as to use the device as a light generation device of FIG. 15A. However, this device also has the following problem (which will be described with reference to FIG. 18 and FIG. 19), and the device of this kind has never been realized.

FIG. 18 shows the amount of light obtained by the light guiding member 2 in which the LED chips 15 are used. The abscissa is a distance from the LED (the nearer the left side of the abscissa, the closer to the LED). The ordinate is the amount of light obtained. FIG. 19 shows how light emitted by the LED chips 15 travels in a line source unit, i.e., an optical path in the unit, and FIG. 19 also describes a light guiding member 2, a cover 3, and a base board 16 which form the line source unit.

As shown in FIG. 19, part of the light emitted by the LED chip 15 which travels in a direction toward the wall of the light guiding member 2 at an angle smaller than the angle $\theta$, undergoes total reflection at the point where the light collides with the wall. The light then travels inside the light guiding member 2. $\theta$ is the angle at which light totally reflects and is determined by the material forming the light guiding member 2. However, part of the light propagating toward the wall of the light guiding member 2 at an angle larger than θ gets through the light guiding member 2 to the cover 3. The light then diffuses to illuminate an original. Therefore, at the place near the LED chip 15, there exists light which is directed toward the wall of the light guiding member 2 at an angle larger than θ. As a result, the amount of light tends to increase at the place near the LED chip 15, as shown in FIG. 18.

On the other hand, in the conventional line source unit described above, the LED chip 7 is small enough to be surrounded by walls of the resin molded member 4 as shown in FIG. 20, only light with a smaller incidence angle propagates inside the light guiding member 2. This causes no problem as far as the amount of light is concerned. One way to avoid such a problem as to the amount of light is to limit an area from the light source and to use light obtained from the area which is far away from the LED of the light source. However, this is against the greatest benefit of the contact-type image sensor, that is, the sensor becomes small in size and light in weight. Therefore, it is not beneficial to adopt a method of limiting the area from the light source.

SUMMARY OF THE INVENTION

The present invention has been made in light of the problems mentioned above, and it is an object of the present invention to provide a line source unit which provides no protrusion in the amount of light obtained by a light generation device of the line source unit, and is capable of obtaining uniform amount of light.

It is another object of the present invention to obtain a line source unit in which only defective light generation devices can be replaced with good ones, and non-defective light generation devices and components can be reused, thus eliminating unnecessary discard of devices and components.

It is still another object of the present invention to provide an image input apparatus which inputs images by using the line source unit mentioned above.

For achieving objectives mentioned above, the present invention provides a line source unit comprising a cover member, a light guiding member which is transparent and is placed within the cover member, and a light source equipped to neighbor both the cover member and the light guiding member, wherein in said line source unit, light emitted by the light source undergoes total reflection to travel through said light guiding member and the light reflected by a light diffusing portion which is formed on the light guiding member is released to the outside the light guiding member via a predetermined facet of the light guiding member, said line source unit including: a first portion of internal surface of the cover member which closely contacts with the light guiding member and extends a predetermined range from said light source, said first portion being constructed to have a light reflection rate smaller than that of a second portion excluding the first portion of said cover member.

In a line source unit according to the present invention, the internal surface of a cover member has a coloring with two colors whose tones are different in their light reflection rate, so as to differentiate the light reflection rate of a first portion from that of a second portion. The coloring associated with the light reflection rate of said first portion has a color density whose reflection rate is less than or equal to 50%.

According to another aspect of the present invention, a line source unit is provided wherein the cover member is shorter in length than the light guiding member by the length corresponding to a first portion, and the light guiding member is optically exposed to the outside through said shortened portion of the cover member, so as to differentiate the light reflection rate of the first portion from that of the second portion.

According to still another aspect of the present invention, a line source unit is provided wherein a light source is located closely to contact with one end of a cover member and a light guiding member or both ends of the cover member and light guiding member, and wherein when the light source is located at said one end, said first portion corresponds to a predetermined range on one end-portion of said cover member, and when said light source is located at said both ends, said first portion corresponds to a predetermined range on both end-portions of said cover member.

According to another aspect of the present invention, a line source unit is provided which further comprising an elastic member placed to press both a cover member and a light guiding member in a direction where the light source is located.

According to another aspect of the present invention, a line source unit is provided wherein the light guiding member gradually changes its sectional area which is maximum in size at the side nearest the light source and minimum at the opposite side.

According to still another aspect of the present invention, a line source unit is provided, wherein the predetermined range extending from the light source is a range determined based on a position where characteristics of the amount of light emitted by the light source show a protruding of said amount of light, on the assumption that a reflection rate of the first portion is the same as that of the second portion.

According to another aspect of the present invention, a line source unit is provided, wherein the light source comprises light generation elements and a base board on which these elements are mounted, and portion of the base board is projected in a shape of pin so that the portion has a plurality of pins which are used for electrically connecting the light source and the outside.

According to another aspect of the present invention, a line source unit is provided, wherein the light generation elements are a package-type light emitting diode, and the elements are individually soldered on the base board. In the line source unit, width (W) of the pin and depth (D) of the base board have a relationship expressed by W≧D.

According to another aspect of the present invention, a line source unit is provided further comprising a prism which intervenes between the cover member and light guiding member and the light source, so that the prism changes a direction of light emitted by the light source to guide the light to the light guiding member.

According to still another aspect of the present invention, a line source unit is provided, wherein the prism is located to closely contact with one end of the cover member and the light guiding member or both ends of the cover member and the light guiding member, and wherein when the light source is located at the one end, the first portion corresponds to a predetermined range on one end-portion of the cover member, and when the light source is located at the both ends, the first portion corresponds to a predetermined range on both end-portions of the cover member. The axis of the light from the light source is perpendicular to a sectional area of the prism, and the area increases its size as the area is away from the light source.

According to another aspect of the present invention, a line source unit further comprising a reflector closely contacting with one of end-faces of the prism which is an end-face opposite to the light source, wherein the reflector changes a direction of light which is traveling inside the prism and going outside the prism and guides the light to the light guiding member. The reflector is a mirror placed to contact with the end-face opposite to the light source, or the reflector is formed by depositing a metal or applying a paint on the end-face.

According to another aspect of the present invention, an image input apparatus is provided for inputting an image using the line source unit according to the above-described invention.

BRIEF DESCRIPTION OF THE DRAWINGS

FIG. 5 shows an external construction of a light generation device according to a fourth embodiment of the present invention.

DETAILED DESCRIPTION OF THE PREFERRED EMBODIMENTS

Embodiments according to the present invention will now be described with reference to accompanying drawings.

First Embodiment

Figure 16:
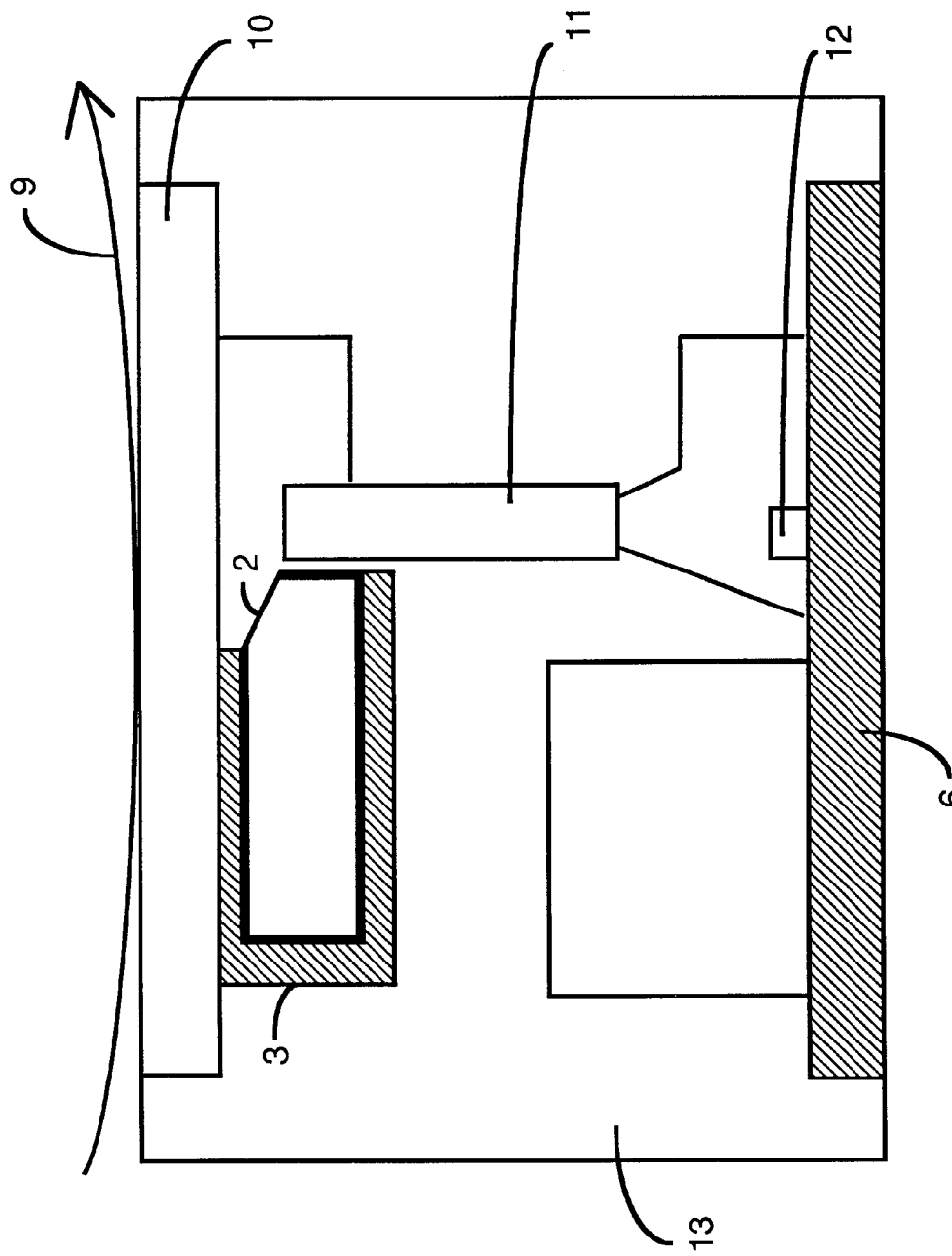
FIG. 16 is a sectional view of an image sensor using a conventional line source unit.

A first embodiment according to the present invention will be described below. It should be noted that construction of an image sensor according to this embodiment is the same as that of the image sensor of FIG. 16 and detailed drawings and explanation of the sensor are not provided here.

Figure 1:
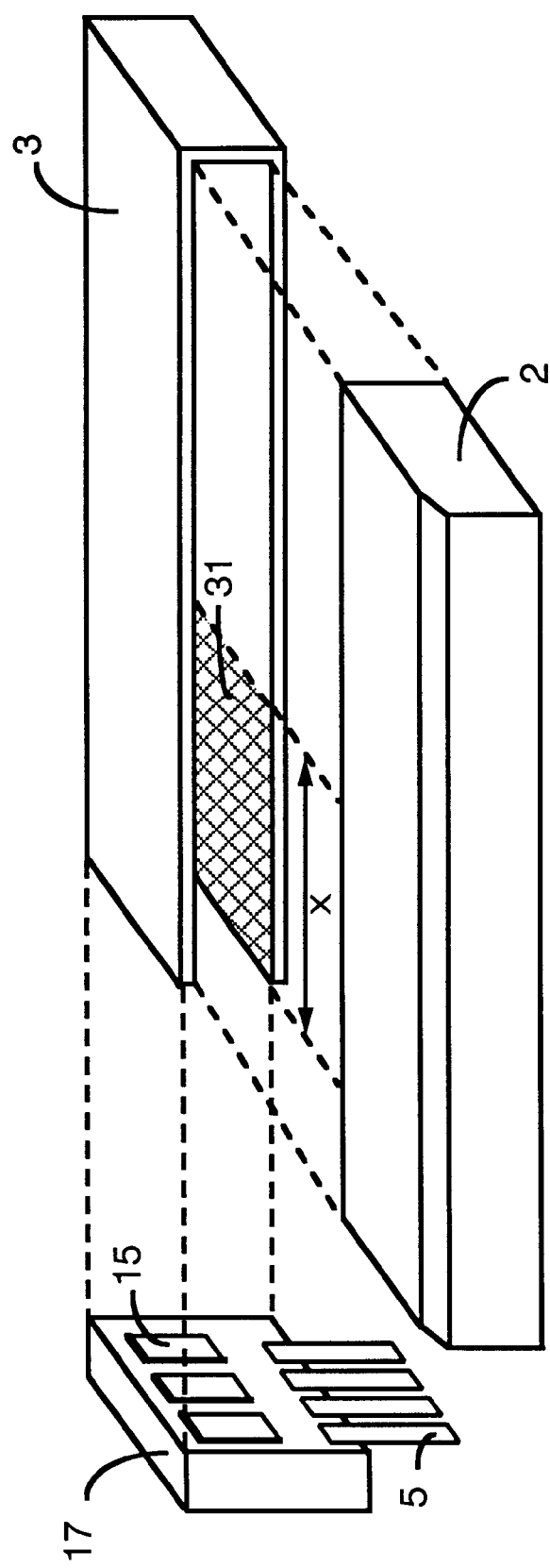
FIG. 1 is a perspective view of a line source unit, with exploded construction parts, according to a first embodiment of the present invention.
Figure 2:
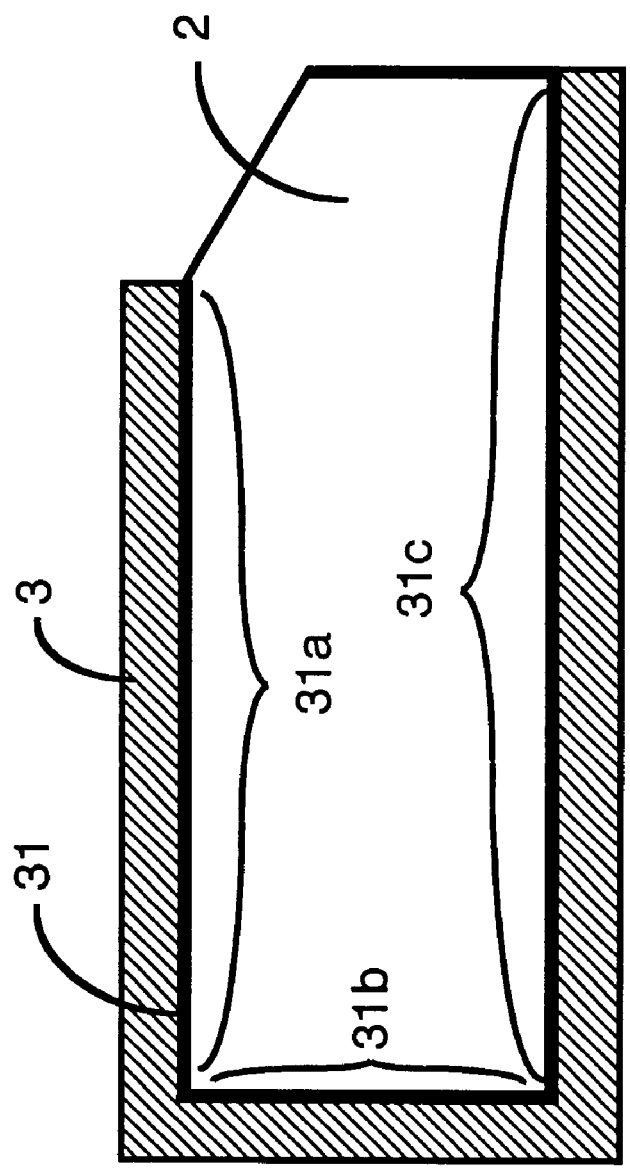
FIG. 2 shows a sectional view of a line source unit according to a first embodiment.

FIG. 1 is a perspective view of a line source unit used in an image sensor according to the first embodiment, including exploded construction parts. FIG. 2 shows a sectional view of the line source unit of FIG. 1. In FIGS. 1 and 2, the same references are used to denote similar parts of the conventional image sensor and the line source unit, thus eliminating explanation of these sensor and unit.

Figure 17:
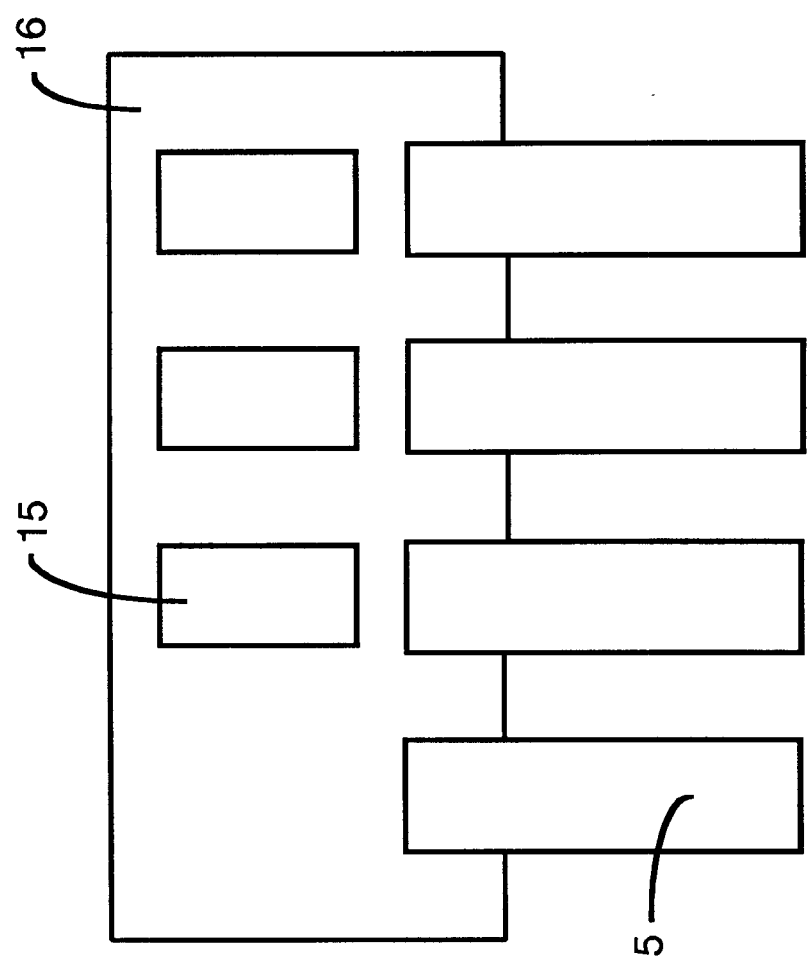
FIG. 17 shows a light generation unit of a line source unit of the prior art.

A light generation device 17 in the line source unit as shown in FIG. 1, has the same construction as the light generation device of the light generation unit shown in FIG. 17. That is, package-type LED) chips 15 are soldered on the light generation device 17, so that these chips can easily be removed from the device and replaced with good ones. A light guiding member 2 for conducting light from the light generation device 17 to an original or document (not shown) is composed of a material which is transparent. A cover 3 plays a role of causing part of the light which passes through the transparent light guiding member 2 but is not directing toward the original, to reflect again to the inside of the light guiding member 2. The cover 3 has a tone with a large reflection rate, such as a tone of white.

A portion in black 31 which is a part of the cover 3 and is positioned inside the cover 3, is a component with a small reflection rate, that is, the portion has a color density of a black with a reflection rate less than or equal to 50%. In FIG. 1, a color of black on the portion 31 is accomplished by painting a corresponding part of the inside of the cover 3 in black. Another way of making the portion 31 black is, for example, to change only the material of the portion 31 of the cover to one with a color of black (in this case, the cover 3 is black in both of its inner and outer parts).

Figure 18:
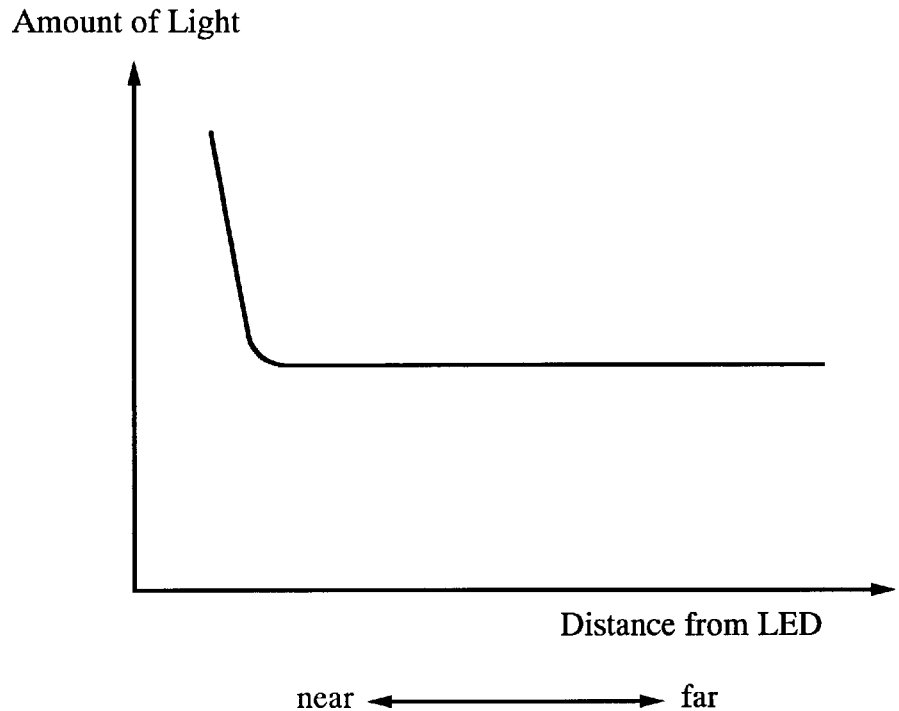
FIG. 18 shows the amount of light obtained by a conventional line source unit.
Figure 19:
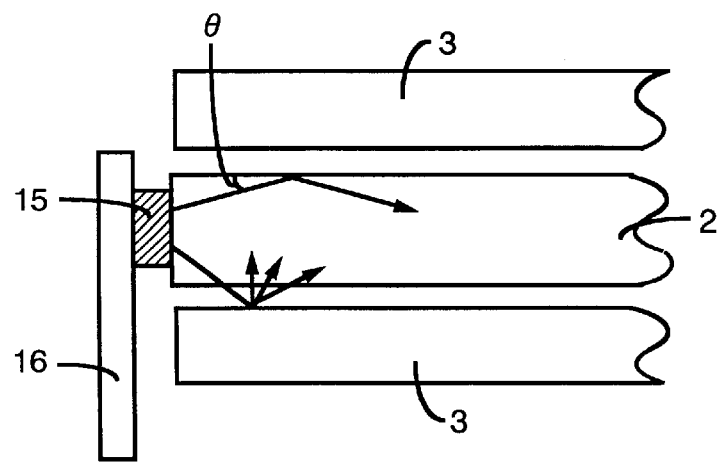
FIG. 19 shows an optical path in a light generation device associated with a conventional line source unit.
Figure 20:
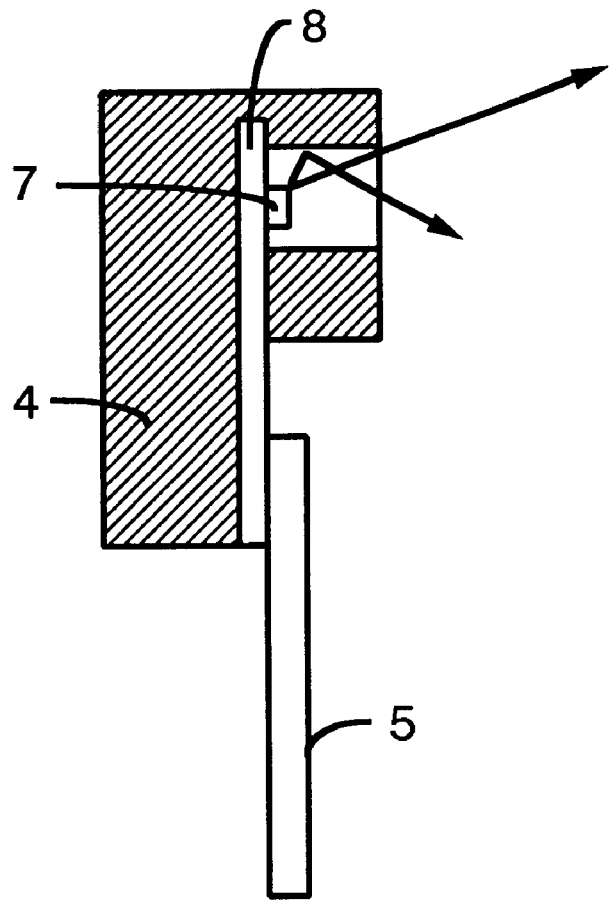
FIG. 20 shows a light generation device of a conventional line source unit, with an LED chip and a plastic molding part.

Length X of the portion in black 31 can be obtained as follows. In a first step, obtain a distance of the position from the LED side on the abscissa where the amount of light shows protrusion, i.e., the protruding position on a characteristic curve for the amount of light emitted by the LED chip 15 as shown in FIG. 18. Then, calculate the equivalent length on an actual cover, the cover 3, based on the obtained distance.

Thus, by letting the inside of the cover 3 to have a low-reflectance tone such as a color of black, within a range defined by the distance X from the light generation device 17, the portion in black 31 exhibits absorption of part of the light emitted from the LED chip on the light generation device 17 which does not totally reflect inside the light guiding member 2 and goes directly to the outside of the light guiding member 2. This construction prohibits irregular reflection, or diffusion of light on the cover 3.

FIG. 2 is a sectional view of the line source unit disconnected at the portion in black 31 with an indication of X, in which the light guiding member 2 and the cover 3 are combined. As shown in FIG. 2, it is understood that the portion in black 31 is deployed to mask three inner faces, 31a, 31b, and 31c of the cover 3.

As explained above, according to this embodiment, the range on the cover defined by a predetermined distance from the light generation device which closely contacts with the cover of the line source unit, is a portion in black, and the inside of the cover has a color tone with a small reflection rate, such as a color of black, therefore part of the light emitted by the LED chips of the light generation device and going directly to the outside of the light guiding member, is absorbed in that portion. The cover thus does not exhibit irregular reflection of the light. As a result, at the LED-chip side of the line source unit, there is no protrusion in the amount of light and the amount of light obtained from the line source unit becomes uniform.

With the use of soldering to implement the package-type LED chip as a light generation device, only defective LED chips from among a plurality of chips can be replaced with good ones, and non-defective LEDs and components can be reused. Accordingly, a line source unit of resources-saving type is provided without performing unnecessary discard of these LEDs and components.

In the embodiment described above, the light generation device 17 is equipped at one side of the light guiding member 2. However, the present invention does not impose a limit upon this configuration. For example, it is possible for the line source unit to have two light generation devices, each of which closely contacts with each side of the light guiding member 2. With this construction, the same effect can be obtained as the first embodiment. This construction requires the cover 3 to have two portions in black to be equipped (i.e., on both end portions of the cover).

Second Embodiment

A second embodiment according to the present invention will be described below. It should be noted that a construction of an image sensor relating to this embodiment is the same as that of the image sensor described in FIG. 16. Therefore, no detail description and drawings are provided here.

Figure 3:
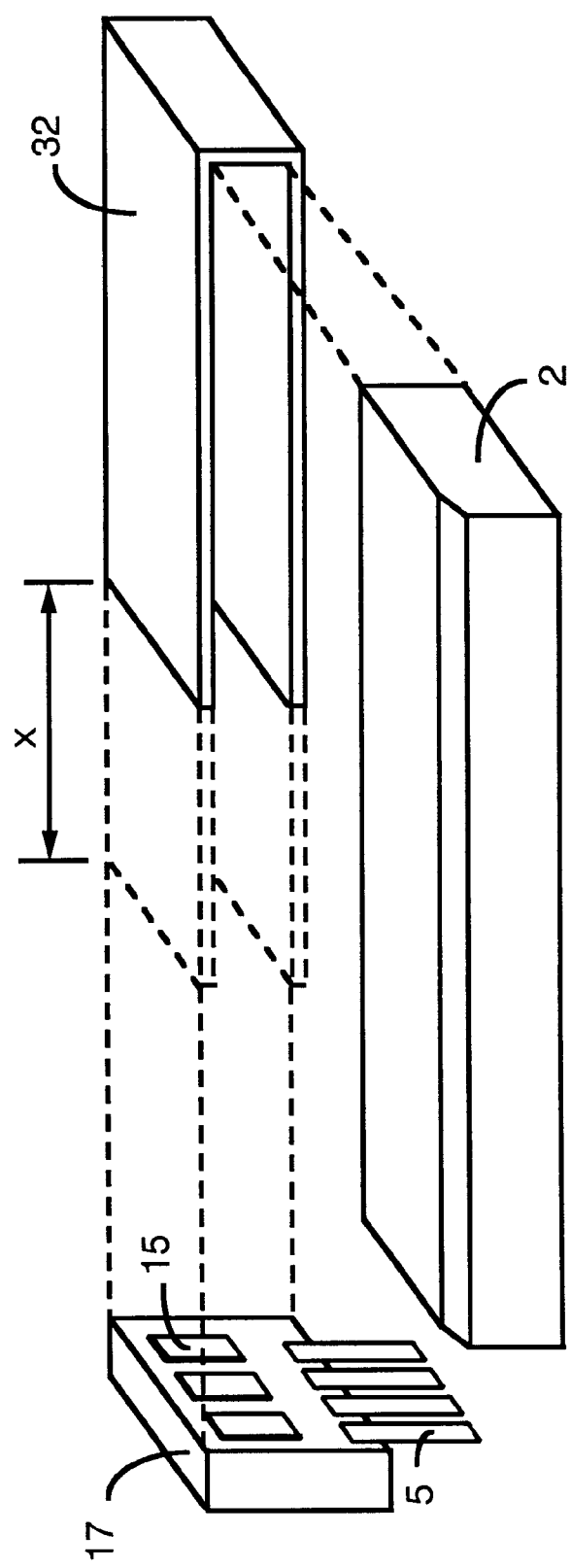
FIG. 3 is a perspective view of a line source unit according to a second embodiment of the present invention.

FIG. 3 shows a perspective view, especially an exploded view of a line source unit used in an image sensor according to the second embodiment. In FIG. 3, the same references are used to denote similar parts of the conventional image sensor and the line source unit, thus eliminating explanation of these sensor and unit.

In the line source unit shown in FIG. 3, construction of a light generation device 17 is the same as that of the device shown in FIG. 17 and a light guiding member 2 has a function to guide light from the light generation device 17 onto an original. Cover 32 causes part of the light which passes through a transparent light guiding member 2 but is not directing toward the original, to reflect again to the inside of the light guiding member 2. The cover 32 has a tone with a large reflection rate, such as a tone of a color of white.

This embodiment is characterized by the cover 32 which is shorter than the light guiding member 2 by the length X at the side near the light generation device 17. If the light guiding member 2 and the cover 32 are combined to fabricate a line source unit, the light guiding member 2 is partly exposed to the outside by the length of X from the position of the light generation device. The reason for having this construction, that is, the light guiding member 2 being partly exposed to the outside, within a range defined by the predetermined length (X), is as follows. It is necessary to prevent part of the light emitted by the LED chip on the light generation device 17, which does not totally reflect inside the light guiding member 2 and goes directly to the outside of the light guiding member 2, from directing toward an original with irregular reflection, or diffusion on the cover 32.

The length X can be obtained in a similar fashion as the first embodiment described above. That is, in a first step, obtain a distance of the position from the LED side on the abscissa where the amount of light shows protrusion, i.e., the protruding position on a characteristic curve for the amount of light emitted by the LED chip 15 as shown in FIG. 18. Then, calculate the equivalent length on an actual cover, the cover 32, based on the obtained distance.

As described above, according to the second embodiment, since the length of the cover is shorter than the light guiding member by the length X, at the side near the light generation device, where the light guiding member is partly exposed to the outside, it is possible to prevent part of the light emitted by the LED chip on the light generation device, which does not totally reflect inside the light guiding member and goes directly to the outside of the light guiding member, from directing toward an original with irregular reflection, or diffusion on the cover. Accordingly, no protrusion of the light is obtained in a place where the light guiding member is exposed to the outside, and a uniform light can be obtained from the line source unit.

Needless to say, by soldering a package-type LED chip as a light generation device for the purpose of implementation, it is possible to replace only defective LED chips from among a plurality of chips, with good ones. Furthermore, non-defective LEDs and components can be reused, which enables to have a line source unit of resources-saving type without performing unnecessary discard of these LEDs and components.

In the second embodiment, the light generation device 17 is equipped at one side of the light guiding member 2. However, the present invention does not impose a limit upon this configuration. It may be possible for the line source unit to have two light generation devices, each of these devices closely contacting with each side of the light guiding member 2 and at the same time, the cover 32 being shorter at its both ends than the light guiding member 2 by the length of X. With this construction, the same effect can be obtained as the second embodiment described above.

Third Embodiment

Third embodiment according to the present invention will be described below. An image sensor relating to the present embodiment is the same as the sensor of FIG. 16, except for the method of fixing a line source unit as described below. Drawings and description of the image sensor are omitted here. For the line source unit of the third embodiment, the same references are used to denote similar parts of the unit according to the first and second embodiments described above.

Figure 4:
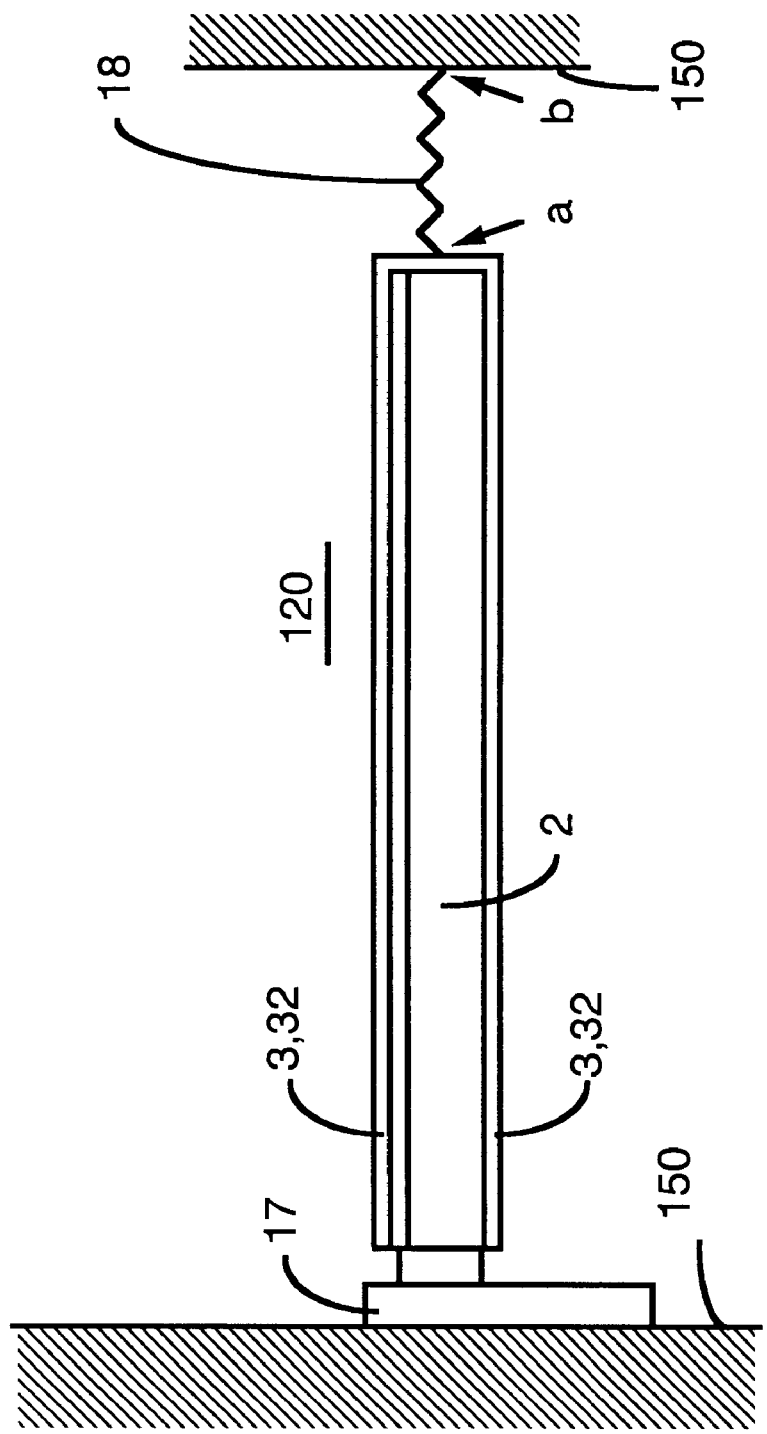
FIG. 4 shows the method of fixing a line source unit according to a third embodiment of the present invention.

FIG. 4 shows the method of fixing a line source unit used in an image sensor according to the third embodiment. A line source unit 120 shown in FIG. 4 is constituted by a light guiding member 2, covers 3 and 32, and an elastic member 18. The light guiding member 2 conducts light coming from a light generation device 17 to an original (not shown). The covers 3 and 32 again reflect part of the light passing through the light guiding member 2 but is not directing toward the original, to the inside of the light guiding member 2. With the use of the elastic member 18, the covers 3 and 32 which incorporate the light guiding member 2 are tightly and closely attached to the light generation device 17.

In this embodiment, the light generation device 17, the light guiding member 2 and the covers 3, 32 are the same as those used in the line source unit according to the first and second embodiments. The covers 3 and 32 therefore have a color tone with a large reflection rate such as a color of white, and inner part of these covers has a low-reflectance tone such as a tone of black, within a range defined by the distance X from the light generation device 17. Alternatively, these covers are shorter than the light guiding member 2 by the length X at the side near the light generation device 17.

At a point a in FIG. 4, the elastic member 18 presses the whole of the line source unit 120 in the direction toward the light generation device 17, with an appropriate pressure, thus allowing the line source unit 120 to be closely contacting to the light generation device 17. The elastic member 18 therefore can be any material with elasticity, such as a coil spring or a rubber. The elastic member 18 is fixed for example, to a housing 150 at a point b for incorporating the line source unit 120, and the light generation device 17 is also fixed to the housing for the same purpose.

As described above, according to the third embodiment, the whole of the line source unit is pressed by the elastic member in the direction toward the light generation device, so that the light guiding member incorporated in the cover of the unit closely contacts with the light generation device, and the light guiding member and the covers have the same construction as that described in the first or second embodiment. As a result, additionally to the effect obtained by the first or second embodiment, it is possible to let the light emitted by the light generation device enter the light guiding member efficiently, thus obtaining a line source unit with a good efficiency of light transfer and a high luminous intensity.

Fourth Embodiment

A fourth embodiment according to the present invention will now be described. It should be noted that a construction of an image sensor relating to this embodiment is the same as that of the image sensor described in FIG. 16. Therefore, no detail description and drawings are provided here.

If a light generation device has a construction where pins are soldered on a base board, the device has the following problem. When LED chips on the device need to be replaced because they are defective or due to their useful life, and a heat is then applied to the soldered part of the chip so as to remove it, the heat transfers to the base board and causes to melt the solder fixing these pins. As a result, the pins are disassembled. A light generation device according to this embodiment is made to solve this problem with a construction described below.

FIG. 5 shows an external construction of a light generation device used in an image sensor according to this embodiment. A light generation device 170 shown in FIG. 5 has a plurality of package-type LED chips 15 arranged on its base board 160. The device also has pins 161 which are a part of the base board 160 projected in the shape of pin. According to an experimental manufacture of the light generation device, the shape of the pin 161, for the purpose of keeping it stabilized, in other words, for preventing the pin from being folded or bent when manufacturing the base board, is required to have the relationship expressed by $y \geq t$, where y is width of the pin 161 and t is thickness of the base board 160.

The pins 161 and base board 160 are in integral construction, so that the light generation device of this type does not raise the problem mentioned above. With the use of the light generation device as well as the light guiding member and the cover having the same construction as that of the first, second or third embodiment, the same effect as that obtained by these embodiments can be acquired According to the fourth embodiment of the present invention, as described above, since pins and base board are in integral construction on the light generation device, and at the same time, there is a prescribed relationship between width of the pin and thickness of the base board, a thermal stress by a heat which is applied to the soldered part of the LED chip for removing the chip causes no trouble to the pins of the light generation device.

It can be easily understood that if the light generation device with a construction described in the fourth embodiment is used in the line source unit according to the first, second or third embodiment, it is possible to achieve the same effect as that of these embodiments.

Fifth Embodiment

A fifth embodiment of the present invention will be described. It should be noted that elements of an image sensor relating to this embodiment is the same as those of the image sensor described in FIG. 16.

Figure 6A:
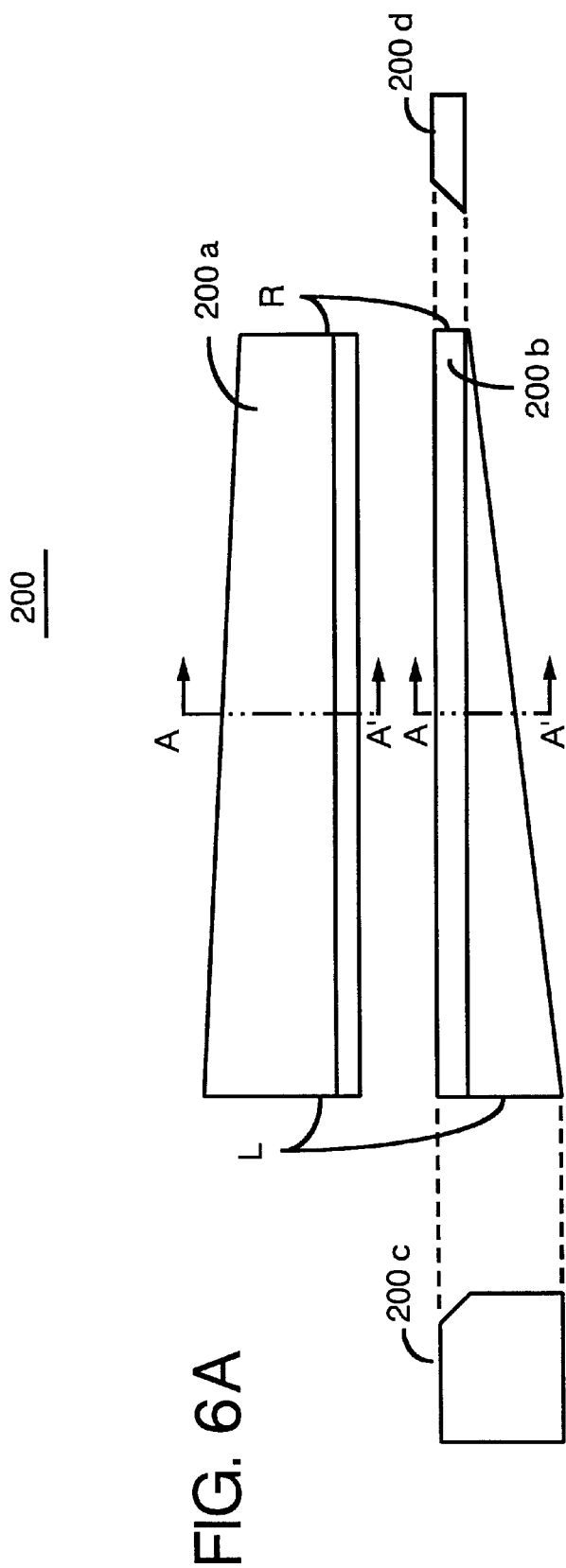
FIGS. 6A and 6B show respectively an outside view and a sectional view of a light guiding member used in a line source unit, according to a fifth embodiment of the present invention.
Figure 6B:
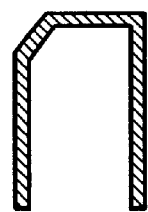

FIGS. 6A and 6B respectively show an outside view and a sectional view of a light guiding member used in a line source unit according to a fifth embodiment. In FIGS. 6A and 6B, a light generation device and a cover which are partly constituting the line source unit, are omitted. More specifically, FIG. 6A includes a plain view 200a, a front view 200b, a left elevation view 200c, and a right elevation view 200d of the light guiding member 200. FIG. 6B is a cross-sectional view of the element which is disconnected along a line A–A' shown in FIG. 6A.

The light guiding member 200 according to this embodiment is constructed to have a shape whose sectional area reduces as proceeding from the L side to the R side. The L side is largest and the R side is smallest in its area. The sectional area corresponding to the line A–A' has an intermediate area.

In the line source unit according to this embodiment, light emitted by a light generation device (not shown) enters the light guiding member from its L side as shown in FIG. 6. Note that in a conventional line source unit, part of the incident light passes through the light guiding member and is released from the side opposite to the incident side. This causes a waste of light. However, in the line source unit according to this embodiment, as the sectional area of the light guiding member becomes gradually smaller in the direction from the incident side to its opposite side, no part of the incident light passes through the light guiding member and is released from the opposite side.

In general, when a sectional area of the light guiding member is reduced to ⅓ in its size, for example, loss of energy of the light passing through that area also becomes ⅓ in its value. In this embodiment, the light guiding member 200 has a sectional area which becomes gradually smaller as mentioned above. As long as this construction is maintained, a rate at which the sectional area is reduced is arbitrary. In other words, it is ideal that the sectional area reduces its size at a constant rate while keeping its similar figure. However, this is not an essential requirement.

As described above, according to the fifth embodiment, the light guiding member has a construction that a sectional area of the member gradually reduces its size in the direction from the incident side to its opposite side. It is therefore possible to prevent no part of the incident light from passing through the light guiding member and releasing from the side opposite to the incident side, thus avoiding a waste of light. Accordingly, a line source unit is realized which is capable of using light energy effectively.

Sixth Embodiment

Sixth embodiment of the present invention will now be described. In this embodiment, the same references are used to denote similar parts of the conventional image sensor, thus omitting the description of these parts.

Figure 7:
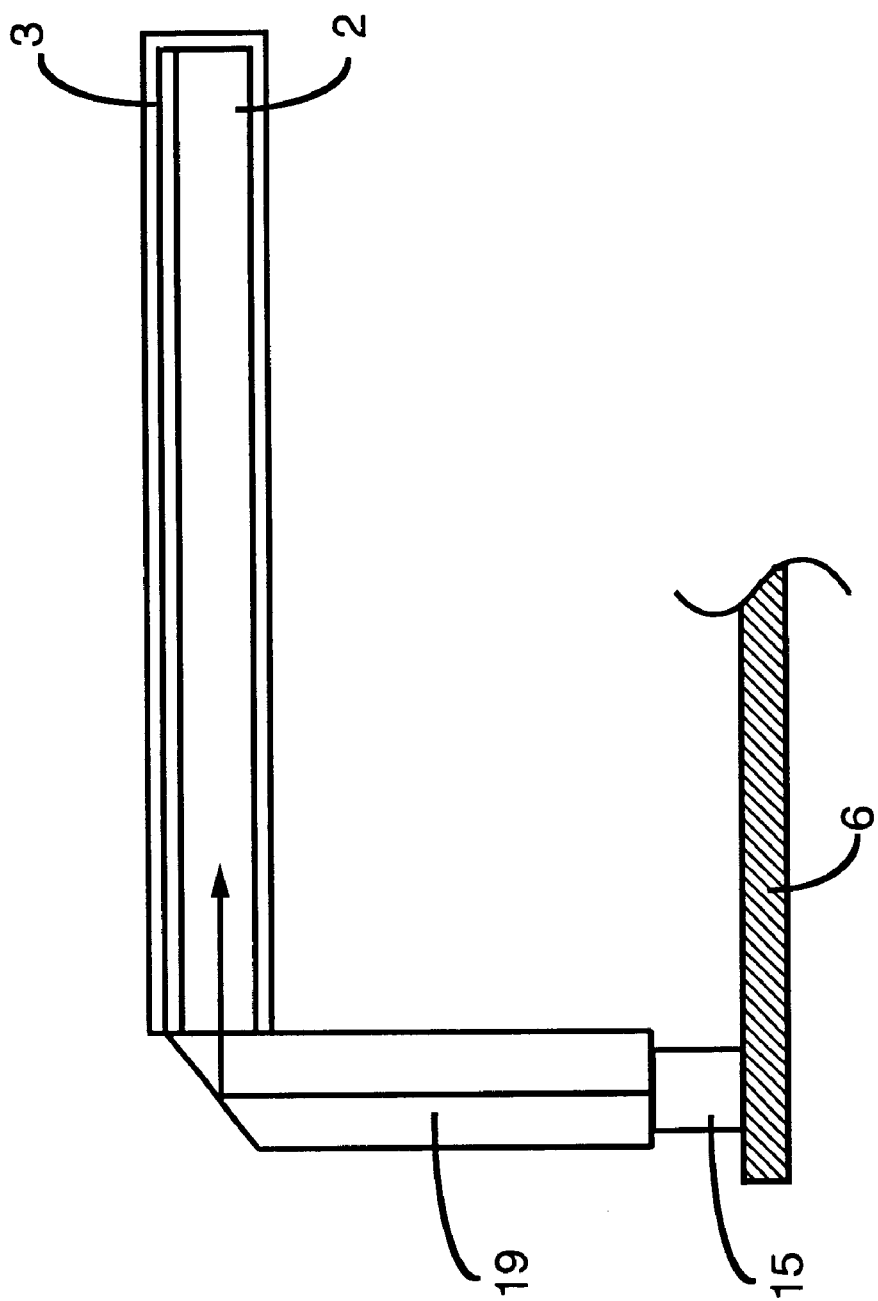
FIG. 7 shows a construction of a line source unit according to a sixth embodiment of the present invention.

FIG. 7 shows construction of a line source unit used in an image sensor according to the sixth embodiment. In FIG. 7, a light guiding member 2 is a member which conducts light emitted by a light generation device (which will be described below) to an original (not shown). A cover 3 reflects again part of the light which passes through the light guiding member 2 but is not directing toward the original, to the inside of the light guiding member 2. The cover 3 has a tone with a large reflection rate, such as a color of white.

Figure 8:
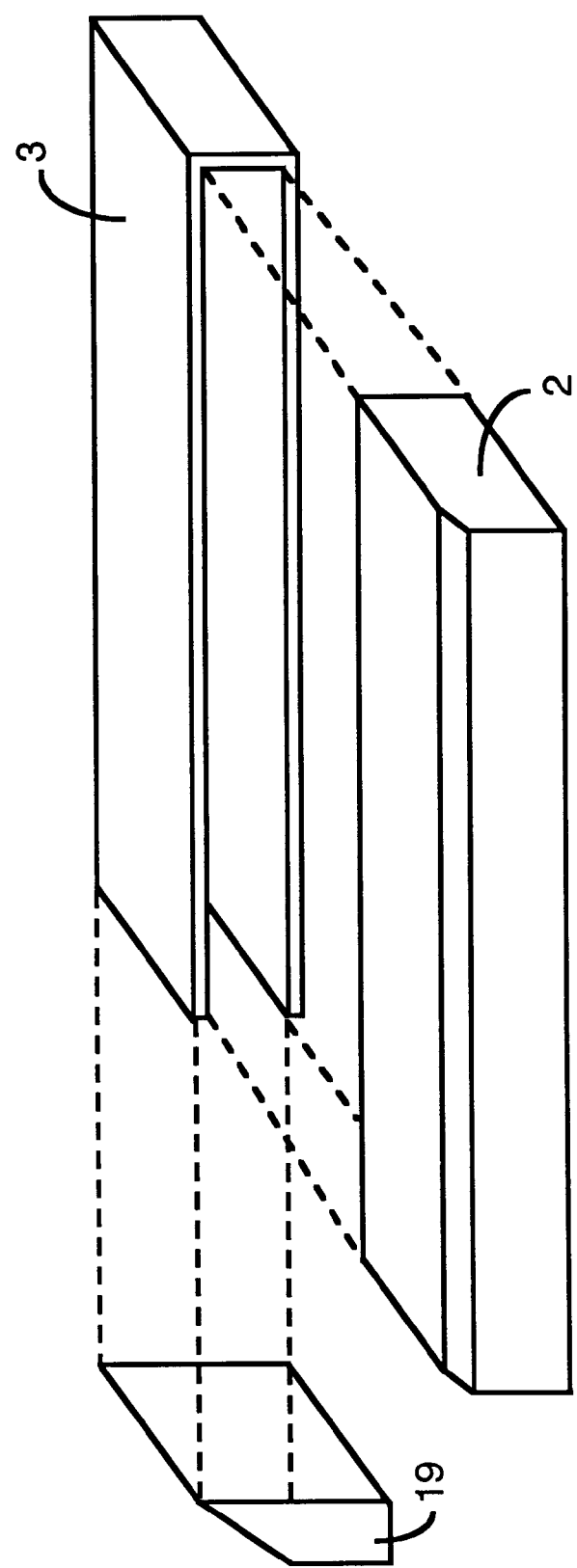
FIG. 8 shows a line source unit of FIG. 7 dissectioned into its components and mutual relationships of these components.

In the image sensor according to this embodiment, package-type LED chips 15 which are the same as those shown in FIG. 17, are mounted on a base board 6. A prism 19 is also arranged to closely contact with both the LED chips 15 and the light guiding member 2. The prism 19 changes a direction of the light emitted by the LED chips 15 (shown by an arrow in FIG. 7), and the light enters the light guiding member 2. FIG. 8 shows a line source unit dissectioned into its components and FIG. 8 also indicates positional relationships of these components. As shown in FIG. 8, the prism 19 of this line source unit is located closely to the side portion formed by the light guiding member 2 and the cover 3 combined.

As explained above, according to this embodiment, since the prism is located proximity to both the LED chips as a light source and the light guiding member, the light can be conducted effectively to the light guiding member including its optical path, even the light source and the point where the light enters are physically apart with each other.

The package-type LED chips are mounted on the base board of the image sensor and the chips act as a light generation device, therefore it is possible to replace only defective LED chips from among a plurality of chips, with good ones. Furthermore, non-defective LEDs and components can be reused, which enables to have a line source unit without performing unnecessary discard of these non-defective LEDs and components.

In the sixth embodiment, the prism 19 is equipped at one side of the light guiding member 2 by way of example. However, the present invention does not impose a limit on this construction. For example, two prisms are respectively equipped at each side of the light guiding member 2, therefore, this construction provides the same effect as that obtained by the embodiment mentioned above.

Seventh Embodiment

Seventh embodiment of the present invention will be described. The main construction of an image sensor according to this embodiment is the same as that of the image sensor described with reference to FIG. 16, therefore, no description and drawings are provided.

Figure 9:
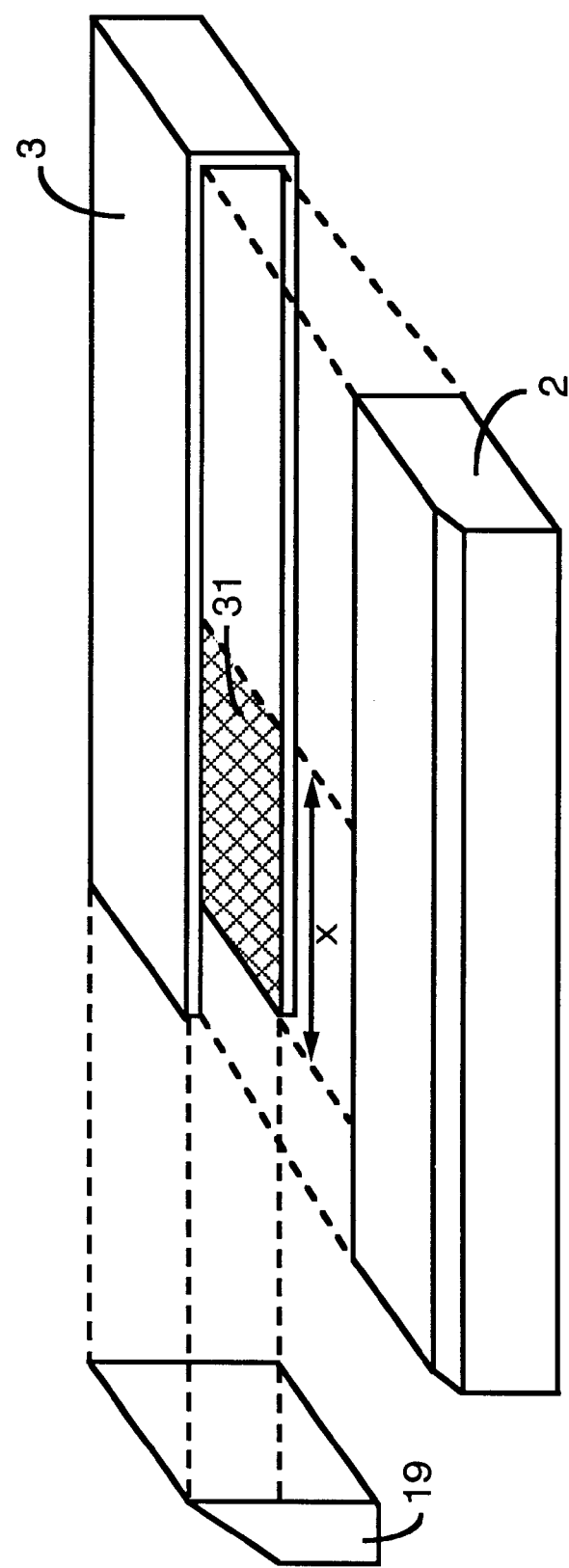
FIG. 9 shows a perspective view of a line source unit in dissectional way, according to a seventh embodiment of the present invention.

FIG. 9 is a perspective view of a line source unit used in an image sensor according to the seventh embodiment, and components are shown in dissectional way in FIG. 9. The line source unit is constituted by combining part of the line source unit shown in FIG. 1 according to the first embodiment, with part of the line source unit shown in FIG. 7 according to the sixth embodiment.

More specifically, in the line source unit shown in FIG. 9, a prism 19 is located proximity to LED chips (not shown) and a light guiding member 2, so as to change the direction of light emitted by the LED chips. Construction associated with the LED chips is the same as that of the LED chips according to the sixth embodiment described above. The light guiding member 2 conducts the light coming from the LED chips to an original, and a cover 3 again reflects part of the light passing through the light guiding member 2 but is not directing toward the original, to the inside of the light guiding member 2.

Similar to the cover according to the first embodiment, the cover 3 has a tone with a large reflection rate, such as a color of white. Inner part of the cover 3 (a portion in black 31), like the one according to the first embodiment, has a tone with a small reflection rate, such as a color of black. The color on the portion in black 31 is, similar to the first embodiment, realized by painting the inner part of the cover 3 in black.

The inner part of the cover 3 has a low-reflectance tone such as a color of black, within a range defined by the distance X from the prism 19, therefore the portion in black 31 exhibits absorption of part of the light coming from the prism 19, which does not totally reflect inside the light guiding member 2 and goes directly to the outside of the light guiding member 2.

Another way of making the part 31 black in color is, for example, to change only the material of the portion in black 31 to one with a color of black. As for the length X of the portion in black 31, similar to the first embodiment, it can be obtained based on a characteristic curve for the amount of light of the LED chips 15 as shown in FIG. 18.

As described above, according to the seventh embodiment, the prism is arranged to closely contact to both the LED chips and the light guiding member, therefore, light can be conducted effectively from the light source to the point where the light enters.

In addition, the inner part of the cover has a tone with a low reflection rate, within a range defined by a predetermined distance from the prism, part of the light which has reached the light guiding member via the prism and goes directly to the outside of the light guiding member, is absorbed in that range. The cover thus does not exhibit irregular reflection of the light. As a result, there is no protrusion in the amount of light at the side where the prism of the line source unit is located, and the amount of light obtained from the line source unit becomes uniform.

Eighth Embodiment

Eighth embodiment of the present invention will be described. The main construction of an image sensor according to this embodiment is the same as that of the image sensor described in connection with FIG. 16, therefore, no description and drawings are provided.

Figure 10:
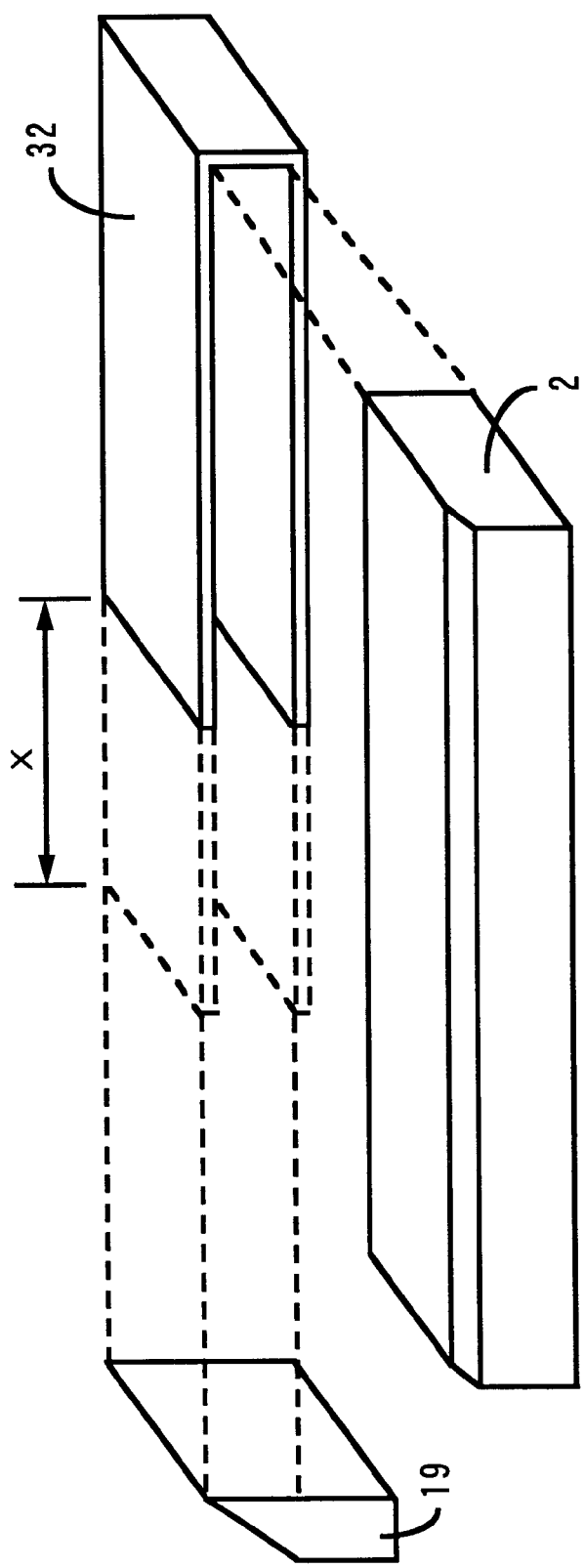
FIG. 10 shows a perspective view of a line source unit in dissectional way, according to an eighth embodiment of the present invention.

FIG. 10 is a perspective view of a line source unit used in an image sensor according to the eighth embodiment, and components are shown in dissectional way. The line source unit is made by combining part of the line source unit shown in FIG. 3 according to the second embodiment, with part of the line source unit shown in FIG. 7 according to the sixth embodiment.

In FIG. 10, a prism 19 is located proximity to LED chips (not shown) and a light guiding member 2, so as to change the direction of light emitted by the LED chips. Construction associated with the LED chips is the same as that of the LED chips according to the sixth embodiment described above. The light guiding member 2 conducts the light from the LED chips to an original, and a cover 32 again reflects part of the light passing through the light guiding member 2 but not directing toward the original, to the inside of the light guiding member 2.

The cover 32, like the one in the second embodiment, is shorter than the light guiding member 2 by the length X at the side near the prism 19. In other words, the light guiding member 2 of the line light source shown in FIG. 10 is exposed to the outside, over the length X from the light generation device 17, when the unit is used. The reason why the light guiding member 2 is exposed to the outside, over the range corresponding to a predetermined distance X, is the same as that described in the second embodiment, which is therefore omitted here.

The length X can be obtained in a similar fashion as the first embodiment described above. Obtain first a distance of the position from the LED side on the abscissa where the amount of light shows protrusion, i.e., the protruding position on a characteristic curve for the amount of light emitted by the LED chip 15. Then, calculate the equivalent length on an actual cover, the cover 32, based on the obtained distance.

As described above, according to the seventh embodiment, the prism is arranged to closely contact to both the LED chips and the light guiding member, therefore, light can be conducted efficiently from the light source to the point where the light enters. At the same time, the light guiding member is exposed to the outside, in a range defined by the predetermined distance from the prism, it is possible to prevent part of the light conducted via the prism, which does not totally reflect inside the light guiding member and goes directly to the outside of the light guiding member, from directing toward an original with irregular reflection, or diffusion on the cover. Accordingly, no protrusion of the light appears at the side where the prism is located, and a uniform light can be obtained from the line source unit.

Ninth Embodiment

Ninth embodiment of the present invention will be described. The main construction of an image sensor according to this embodiment is the same as that of the image sensor described in connection with FIG. 16, therefore, no description and drawings are provided.

Figures 11A, 11B:
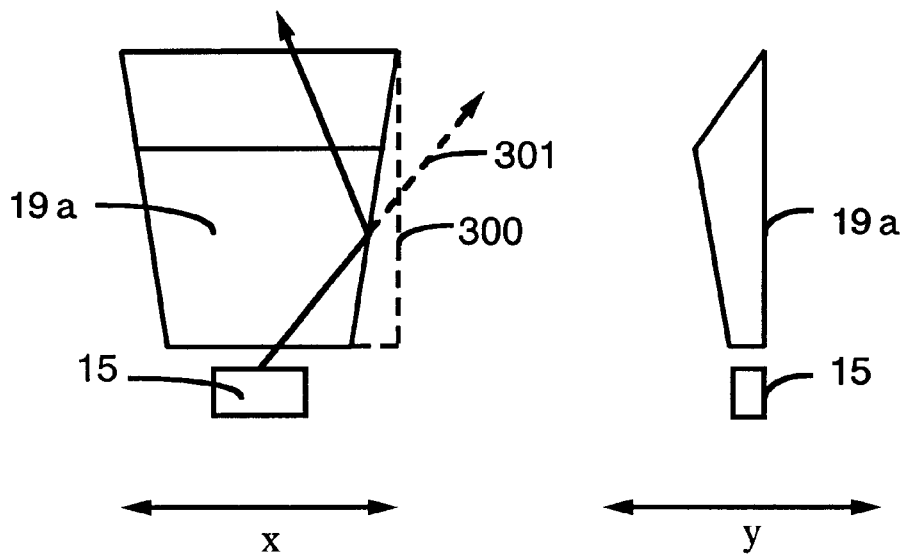
FIGS. 11A and 11B show a prism used in a line source unit according to a ninth embodiment of the present invention.

FIGS. 11A and 11B show a prism used in a line source unit which constitutes an image sensor according to this embodiment. In FIG. 11A, direction of the light emittted by an LED chip 15 as a light source, is changed by a prism 19a. The prism 19a is located proximity to both the LED chip 15 and a light guiding member (not shown) in a similar way as in the sixth embodiment. The prism 19a has a form as shown in FIGS. 11A and 11B, which increases its width and thickness (depth) as being away from the LED chip 15 in both directions, x and y.

The reason for taking this form is as follows. If the prism 19a maintains its form (width) at any position away from the LED chip 15 as shown by a broken line 300 in FIG. 11A, part of the light coming from the LED chip 15 which travels through the prism 19a with relatively larger angles, does not totally reflect on the facets of the prism and goes outside the prism as shown by a broken line 301 in FIG. 11A. Considering this, the prism 19a has a form which increases both its width and depth, that is, in both x and y directions, as being away from the LED chip 15. As a result, the light traveling through the prism 19a with relatively larger angles does not totally reflect on the faces of this prism.

As explained above, according to this embodiment, the prism is arranged to closely contact with both the LED chips and the light guiding member, therefore, light can be conducted efficiently from the light source to the point where the light enters. At the same time, since the prism has a form which expands its width and depth in the direction away from the light source, the light traveling through the prism with relatively larger angles does not totally reflect on the facets of the prism. This enables an efficient use of the light coming from the LED chips, namely, a light source.

Tenth Embodiment

Tenth embodiment of the present invention will now be described. The main construction of an image sensor according to this embodiment is the same as that of the image sensor described in connection with FIG. 16, therefore, no drawings and description are provided.

Figure 12:
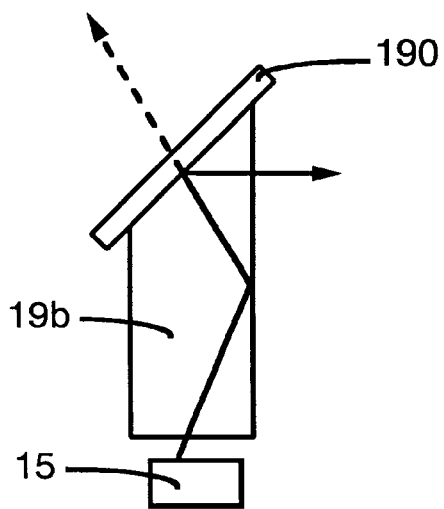
FIG. 12 shows a prism used in a line source unit according to a tenth embodiment of the present invention.
Figure 13:
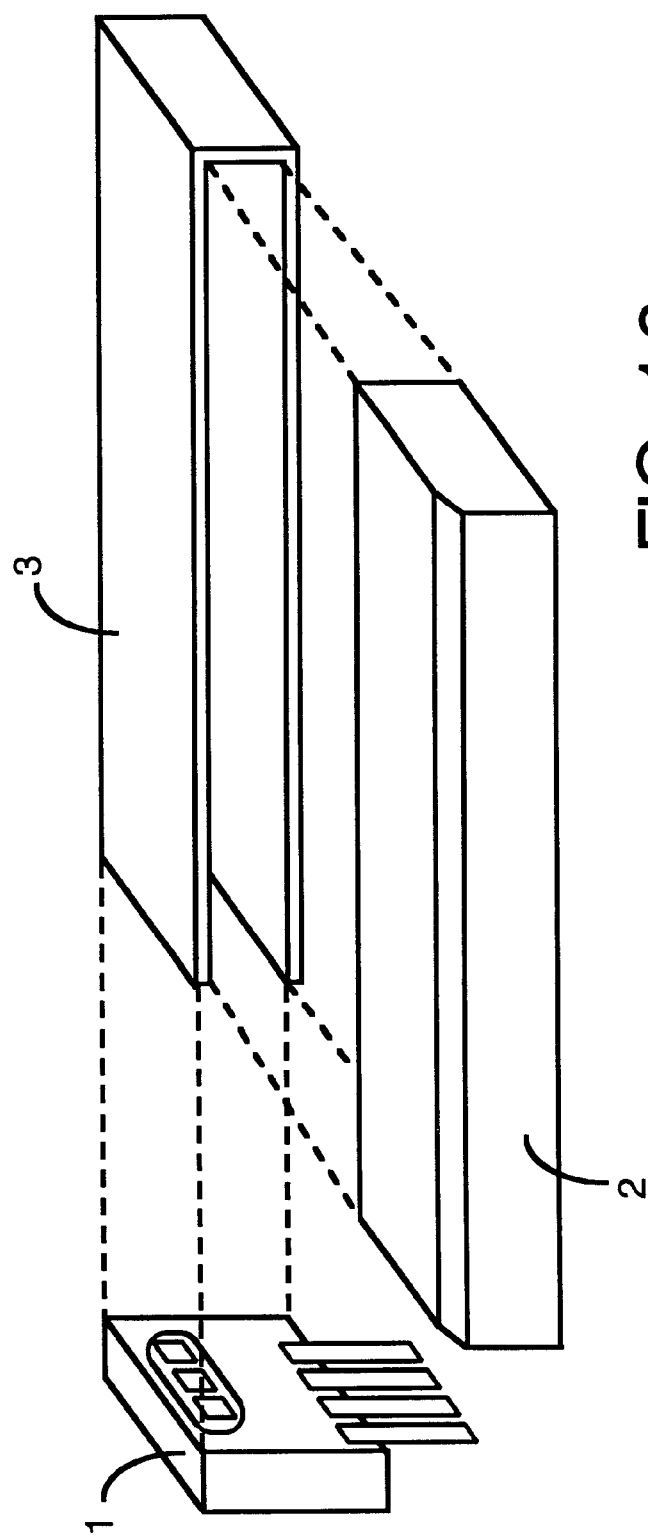
FIG. 13 a perspective view of a conventional line source unit, with exploded construction parts.
Figure 14:
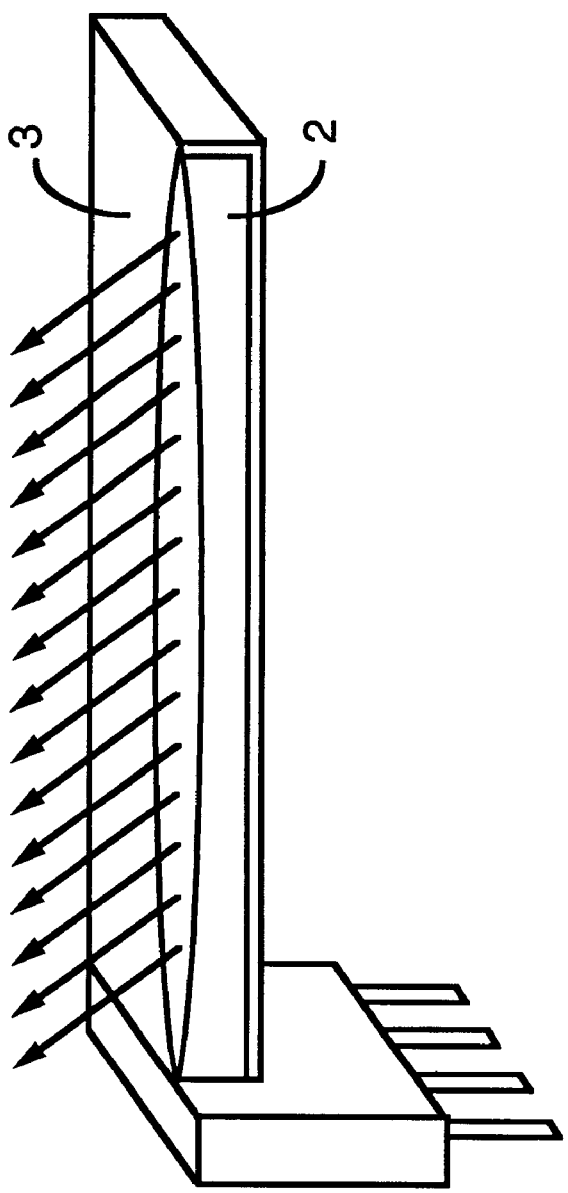
FIG. 14 shows a conventional line source unit from which light of line-shaped being emitted.
Figures 15A, 15B:
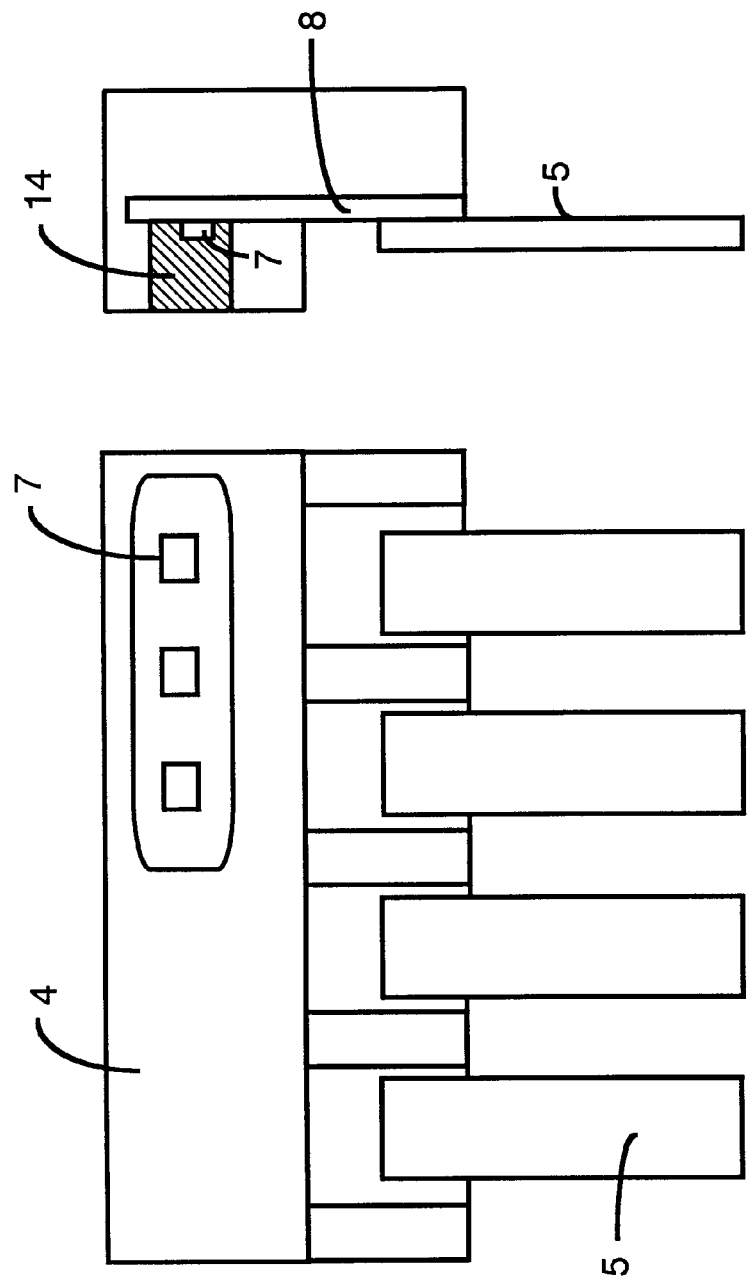
FIGS. 15A and 15B show a conventional light generation device.

FIG. 12 shows a prism used in a line source unit which constitutes an image sensor according to this embodiment. In FIG. 12, direction of the light originated from an LED chip 15 (a light source) is changed by a prism 19b. The prism 19b is located proximity to both the LED chip 15 and a light guiding member (not shown) in a similar way as in the above embodiments.

A reflection member 190 positioned at the upper part of the prism 19b has a reflection surface such as a mirror. The member is tightly attached to a slant surface of the prism 19b so as to change a direction of the light coming from the LED chip 15 via the prism 19b, to a predetermined direction. If the prism 19b lacks the reflection member attached on its slant surface, for changing the direction of the light originated the LED chip 15, there exists light which does not totally reflect and goes outside the prism 19b, as shown by a broken line in FIG. 12.

As explained above, according to this embodiment, the prism is arranged to closely contact with both the LED chips and the light guiding member, therefore, light can be conducted efficiently from the light source to the point where the light enters. The prism also has the reflection member with a prescribed form attached on its slant surface to change light originated the source to the predetermined direction. This enables all of the light which have reached a surface of the reflection member to go to the predetermined direction and prevent the light from going outside the prism.

A member which is used as the reflection member 190 of the line source unit according to the tenth embodiment is not limited to a mirror. The member may be a material with a metallic luster such as an aluminum foil. Alternatively, the slant surface of the prism 19b itself may have a mirror-finished surface, that is, the slant surface is silvered by depositing a mete such as aluminum or by applying a paint with a metallic color.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A line source unit comprising a cover member, a light guiding member which is independent of said cover member, and which is transparent and is placed within the cover member, and a light source equipped to neighbor both the cover member and the light guiding member, wherein in said line source unit, light emitted by the light source undergoes total reflection to travel through said light guiding member and the light reflected by a light diffusing portion which is formed on the light guiding member is released to outside of the light guiding member via a predetermined facet of the light guiding member, said line source unit including:

a first portion of an internal surface of the cover member being in close contact with the light guiding member and extending a predetermined range from said light source, said first portion being constructed to have a light reflection rate smaller than that of a second portion of said internal surface of said cover member excluding the first portion.

2. The line source unit according to claim 1, wherein the internal surface of said cover member has a coloring with two colors whose tones are different in their light reflection rate, so as to differentiate the light reflection rate of said first portion from that of said second portion.

3. The line source unit according to claim 2, wherein said coloring associated with the light reflection rate of said first portion has a color density whose reflection rate is less than or equal to 50%.

4. The line source unit according to claim 1, wherein said cover member is shorter in length than said light guiding member by the length corresponding to said first portion, and said light guiding member is optically exposed to the outside through said shortened portion of the cover member, so as to differentiate the light reflection rate of said first portion from that of said second portion.

5. The line source unit according to claim 4, wherein said light source is located closely to contact with one end of said cover member and said light guiding member or both ends of said cover member and said light guiding member, and wherein when said light source is located at said one end, said first portion corresponds to a predetermined range on one end-portion of said cover member, and when said light source is located at said both ends, said first portion corresponds to a predetermined range on both end-portions of said cover member.

6. The line source unit according to claim 1, further comprising an elastic member which is placed to press both said cover member and light guiding member in a direction where said light source is located.

7. The line source unit according to claim 4, wherein said light guiding member gradually changes its sectional area which is maximum in size at the side nearest said light source and minimum at the opposite side.

8. The line source unit according to claim 1, wherein said predetermined range extending from said light source is a range determined based on a position where characteristics of the amount of light emitted by the light source show a protruding of said amount of light, on the assumption that a reflection rate of said first portion is the same as that of said second portion.

9. The line source unit according to claim 1, wherein said light source comprises light generation elements and a base board on which said elements are mounted, and portion of the base board is projected in a shape of pin so that the portion has a plurality of pins which are used for electrically connecting said light source and the outside.

10. The line source unit according to claim 9, wherein said light generation elements are a package-type light emitting diode, said elements being individually soldered on said base board.

11. The line source unit according to claim 9, wherein width (W) of said pin and depth (D) of said base board have a relationship expressed by W≧D.

12. The line source unit according to claim 4, further comprising a prism which intervenes between said cover member and light guiding member and said light source, so that the prism changes a direction of light emitted by said light source to guide the light to said light guiding member.

13. The line source unit according to claim 12, wherein said prism is located to closely contact with one end of said cover member and said light guiding member or both ends of said cover member and said light guiding member, and wherein when said light source is located at said one end, said first portion corresponds to a predetermined range on one end-portion of said cover member, and when said light source is located at said both ends, said first portion corresponds to a predetermined range on both end-portions of said cover member.

14. The line source unit according to claim 13, wherein the axis of the light from said light source is perpendicular to a sectional area of said prism, said area increasing its size as said area is away from the light source.

15. The line source unit according to claim 14, further comprising a reflector closely contacting with one of end-faces of said prism which is an end-face opposite to said light source, wherein said reflector changes a direction of light which is traveling inside the prism and going outside the prism and guides the light to said light guiding member.

16. The line source unit according to claim 15, wherein said reflector is a mirror placed to contact with the end-face opposite to said light source, or said reflector is formed by depositing a metal or applying a paint on said end-face.

17. An image input apparatus for inputting an image using a line source unit, said line source unit comprising a cover member, a light guiding member which is independent of said cover member, and which is transparent and is placed within the cover member, and a light source equipped to neighbor both the cover member and the light guiding member, wherein in said line source unit, light emitted by the light source undergoes total reflection to travel through said light guiding member and the light reflected by a light diffusing portion which is formed on the light guiding member is released to outside of the light guiding member via a predetermined facet of the light guiding member, and wherein said line source unit including:

a first portion of an internal surface of the cover member being in close contact with the light guiding member and extending a predetermined range from said light source, said first portion being constructed to have a light reflection rate smaller than that of a second portion of said internal surface of said cover member excluding the first portion.

18. The image input apparatus according to claim 17, wherein the internal surface of said cover member has a coloring with two colors whose tones are different in their light reflection rate, so as to differentiate the light reflection rate of said first portion from that of said second portion.

19. The image input apparatus according to claim 17, wherein said cover member is shorter in length than said light guiding member by the length corresponding to said first portion, and said light guiding member is optically exposed to the outside through said shortened portion of the cover member, so as to differentiate the light reflection rate of said first portion from that of said second portion.

20. The image input apparatus according to claim 19, further comprising a prism which intervenes between said cover member and light guiding member and said light source, so that the prism changes a direction of light emitted by said light source to guide the light to said light guiding member.

* * * * *

UNITED STATES PATENT AND TRADEMARK OFFICE
CERTIFICATE OF CORRECTION

PATENT NO. : 6,307,648 B1
DATED : October 23, 2001
INVENTOR(S) : Toshio Matsumoto It is certified that error appears in the above-identified patent and that said Letters Patent is hereby corrected as shown below:

<u>Column 14,</u>
Line 27, "mete" should be -- metal --.

Signed and Sealed this

Fourteenth Day of January, 2003

JAMES E. ROGAN
*Director of the United States Patent and Trademark Office*